(12) United States Patent
Varanasi et al.

(10) Patent No.: US 9,062,563 B2
(45) Date of Patent: Jun. 23, 2015

(54) SURFACE TREATMENTS FOR PREVENTING HYDROCARBON THERMAL DEGRADATION DEPOSITS ON ARTICLES

(75) Inventors: Kripa Kiran Varanasi, Clifton Park, NY (US); Nitin Bhate, Rexford, NY (US); Jeffrey Scott Goldmeer, Latham, NY (US); Geoffrey David Myers, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 2205 days.

(21) Appl. No.: 12/100,029

(22) Filed: Apr. 9, 2008

(65) Prior Publication Data

US 2009/0255266 A1 Oct. 15, 2009

(51) Int. Cl.
*C23C 30/00* (2006.01)
*F23R 3/00* (2006.01)
(Continued)

(52) U.S. Cl.
CPC ............ *F01D 25/005* (2013.01); *B05D 5/02* (2013.01); *B05D 5/08* (2013.01); *B05D 5/083* (2013.01); *C23C 30/00* (2013.01);
(Continued)

(58) Field of Classification Search
CPC ....... F01D 25/005; C23C 30/00; F23R 3/002; F23R 2900/00004; B05D 5/02; B05D 5/08; B05D 5/083; F23D 2900/00016; F23M 2900/05004; Y02T 50/67; Y02T 50/672
USPC .................................................. 60/752–760
See application file for complete search history.

(56) References Cited

U.S. PATENT DOCUMENTS 2,545,495 A * 3/1951 Sforzini ....................... 60/756
5,343,691 A 9/1994 Coffinberry
(Continued)

FOREIGN PATENT DOCUMENTS

JP 11270852 A 10/1999
JP 2000039148 A 2/2000
(Continued)

OTHER PUBLICATIONS

Dean, Anthony J., et al. "Deposit Formation From No. 2 Distillate at Gas Turbine Conditions", Presented at the International Gas Turbine and Agroengine Congress & Exhibition, dated Jun. 10-13, 1996, pp. 1-6.
(Continued)

*Primary Examiner* — William H Rodriguez
*Assistant Examiner* — Carlos A Rivera
(74) *Attorney, Agent, or Firm* — Ann M. Agosti

(57) ABSTRACT

A method of preventing thermal hydrocarbon degradation deposits on a surface of a gas turbine component, the method includes providing the turbine component comprising the surface configured for contacting a hydrocarbon fluid, wherein the substrate comprises a material having a nominal liquid wettability sufficient to generate, with reference to an oil, a nominal contact angle, disposing a plurality of features on the substrate to form an anti-deposition surface texture, wherein the plurality of features have a size, shape, and orientation selected such that the surface has an effective wettability sufficient to generate, with reference to an oil, an effective contact angle of greater than the nominal contact angle, and the features comprise a width dimension (a), and a spacing dimension (b), wherein the features prevent the hydrocarbon fluid from penetrating into the surface texture and thereby reduce the adhesion of the thermal hydrocarbon deposits to the surface.

20 Claims, 10 Drawing Sheets

(51) Int. Cl.
    *F01D 25/00* (2006.01)
    *B05D 5/02* (2006.01)
    *B05D 5/08* (2006.01)

(52) U.S. Cl.
    CPC .............. F23D 2900/00016 (2013.01); F23M
        2900/05004 (2013.01); *F23R 3/002* (2013.01);
        F23R 2900/00004 (2013.01); Y02T 50/67
        (2013.01); Y02T 50/672 (2013.01); F05D
        2250/60 (2013.01)

(56) References Cited

U.S. PATENT DOCUMENTS

| | | | |
|---|---|---|---|
| 5,891,584 | A | 4/1999 | Coffinberry |
| 6,250,063 | B1 | 6/2001 | Davis, Jr. et al. |
| 6,267,583 | B1 | 7/2001 | Mandai et al. |
| 6,286,302 | B1 | 9/2001 | Farmer et al. |
| 6,378,310 | B1 | 4/2002 | Le et al. |
| 6,598,383 | B1 | 7/2003 | Vandervort et al. |
| 6,715,292 | B1 | 4/2004 | Hoke et al. |
| 6,986,253 | B2 * | 1/2006 | Leen et al. ................. 60/772 |
| 7,013,649 | B2 | 3/2006 | Monty |
| 7,334,982 | B2 | 2/2008 | Singh et al. |
| 7,520,745 | B2 | 4/2009 | Oomens et al. |
| 7,690,184 | B2 | 4/2010 | Gauthier et al. |
| 7,891,191 | B2 | 2/2011 | Yoshida et al. |
| 2006/0080966 | A1 | 4/2006 | Widener |
| 2007/0028588 | A1 | 2/2007 | Varanasi et al. |
| 2007/0031639 | A1 * | 2/2007 | Hsu et al. .................. 428/141 |
| 2007/0033945 | A1 | 2/2007 | Goldmeer et al. |
| 2007/0059490 | A1 | 3/2007 | Kaneko |
| 2008/0145631 | A1 | 6/2008 | Bhate |

FOREIGN PATENT DOCUMENTS

| | | |
|---|---|---|
| JP | 2000320835 A | 11/2000 |
| JP | 2000320836 A | 11/2000 |
| JP | 2004360944 A | 12/2004 |
| JP | 2005337703 A | 12/2005 |
| JP | 2006071181 A | 3/2006 |
| JP | 2006312938 A | 11/2006 |
| JP | 2007024357 A | 2/2007 |
| JP | 2007076242 A | 3/2007 |
| JP | 2008025568 A | 2/2008 |
| WO | 2006042796 A2 | 4/2006 |

OTHER PUBLICATIONS

Japanese Office Action issued in connection with corresponding JP Application No. 2009-091721 on Jul. 9, 2014.

* cited by examiner

SURFACE TREATMENTS FOR PREVENTING HYDROCARBON THERMAL DEGRADATION DEPOSITS ON ARTICLES

BACKGROUND OF THE INVENTION

The present disclosure relates generally to deposits formed on surfaces in contact with hydrocarbon fluids, and more particularly, to surfaces incorporating a texture designed to inhibit the formation of coke, soot, and oil deposits. This disclosure also relates to articles comprising such surfaces, and methods for making such articles and surfaces.

As used herein, hydrocarbon fluid is generally defined as hydrocarbon liquids, hydrocarbon gases, or mixtures thereof. As used herein, "hydrocarbon fluid degradation products" includes products which form from the hydrocarbons, for example, certain polymers resulting from thermal transformation of paraffins to cycloparaffins, aromatics and polycyclic molecules in the hydrocarbon, as well as products which result from actual decomposition of the fuel, e.g., carbon.

Because high temperature is usually associated with undesirable levels of hydrocarbon fluid deposit formation, the subject herein is commonly referred to as thermal instability, or in the case of fuels, as fuel instability. Flowing hydrocarbon fluids including lubricating oils, hydraulic oils, combustible fuels, and the like can form soot, coke, and oil deposits on the surface of containment walls and other parts which they contact, when the fluid and/or surface are heated. For example, "coking" involves the solidification of liquid fuels into carbonaceous deposits that tend to form on heated surfaces in contact with the liquid fuels. Examples of processes and systems affected by such deposition can include, petrochemical processes, machine tools, automobile engines, aircraft gas turbine engines, marine and industrial engines, and the like in which surface deposits from hydrocarbon fluids, fuels and oils are a major problem. Deposits can foul heat exchangers, plug fuel injectors, as well as lubrication distribution jets, jam control valves and cause problems with many other types of operating and control devices associated with hydrocarbon fluids, fuels and oils. Moreover, such deposition can reduce fuel flow, increase fuel line operating pressures, and reduce the performance of the injection and/or combustion system, or the entire process, system or engine.

In one example, solid deposits and varnishing occur on liquid fuel-wetted internal and external surfaces of the fuel supply system. In addition to the fuel injectors, other fuel wetted-components, including manifolds, metering valves, distribution valves, and air purge/check valves exposed to both fuel and high temperature air or high ambient temperatures can suffer from coking and carbon formation. Conditions for coking are a function of fuel composition, dissolved oxygen concentration, surface roughness, surface composition, and many other variables impact the coking rate in a hydrocarbon fuel. The current practice is to limit fuel-wetted surface temperatures to 300 degrees Fahrenheit (° F.) or less to minimize carbon formation. This is difficult in the typical gas turbine environment, where the compressor discharge temperatures for relatively low pressure ratio/performance machines exceeds 700° F., and for higher performance systems exceeds 1000° F.

A second type of carbon formation, which can extend to both liquid and gas-fired combustion systems, occurs when solid carbon particles and soot agglomerate on the combustion system components. Such carbon deposits, often called 'clinkers' impair air and fuel distribution in the combustor, driving up emissions, component metal temperatures, and skewing the combustor exit temperature profile, reducing the life of downstream components. Such solid carbon deposits can also cause erosion of the rotating turbine airfoils, impacting both performance and life, when these large 'clinkers' are dislodged by vibration, air flow, or differential thermal growth, and disintegrate in the downstream turbine. Since the collisions between the large-scale carbon deposits and airfoils can occur at very high relative velocity, (hundreds or even thousands of ft/s), and the carbon is remarkably hard in this form, erosion of the airfoil surfaces is a durability problem.

One particular problem area for liquid fueled on-wing and aeroderivative engines is the splashplate. On these types of engines, coke can build up on the splashplate and eventually the coke can flake off and damage barrier coatings on the combustor components. Such problems can have a severe impact on the operability of the engine. Another area of concern with coking in current gas turbine engines are the fuel lines leading up to the combustor. If the fuel line temperature is within a certain temperature window, coke can form inside the fuel lines, increasing the required pumping pressure and/or restricting fuel flow to the engine.

As mentioned above, one method of mitigating the build-up of coke and other deposits in fuel lines and other contact surfaces of turbine engines has been to keep the temperature low enough to prevent the coke deposition reaction from occurring. Such turbine engines, however, are forced to operate at less than optimal temperatures, and therefore, can be inefficient. Alternatively, cooling apparatuses have been added to the combustion systems to keep the temperatures of the surfaces lower without sacrificing optimal ignition temperatures. The apparatuses, however, add cost and complexity to the turbine engine designs. Another method has been to coat the surfaces with a catalyst or coating, sometimes referred to as Coke Barrier Coatings (CBC), wherein the coatings are chemically designed to inhibit the bonding of thermal deposits to the surfaces. Again, the special coatings add cost and an additional process step to the design of a turbine engine. Moreover, some current coatings are not suitable for every type of thermal deposition that can occur in the combustion system. Yet another method of dealing with thermal deposition has been to modify the hydrocarbon fuel with additives. The fuel must be pre-treated before being used, however, or special fuels with the additives already mixed must be purchased at a premium.

A surface for a metal article which inhibits the formation of thermal deposits, particularly an anti-coking surface, without resorting to modification of the hydrocarbon fluid, without adoption of special procedures, and without the installation of special equipment could be desirable for current liquid fuel turbines and other like apparatuses.

BRIEF DESCRIPTION OF THE INVENTION

Disclosed herein are methods of having a surface configured to prevent the formation of thermal deposits.

In one embodiment a method of preventing thermal hydrocarbon degradation deposits on a surface of a gas turbine component includes, providing the turbine component comprising the surface configured for contacting a hydrocarbon fluid, wherein the substrate comprises a material having a nominal liquid wettability sufficient to generate, with reference to an oil, a nominal contact angle, disposing a plurality of features on the substrate to form an anti-deposition surface texture, wherein the plurality of features have a size, shape, and orientation selected such that the surface has an effective wettability sufficient to generate, with reference to an oil, an effective contact angle of greater than the nominal contact angle, and the features comprise a width dimension (a), and a spacing dimension (b), wherein the features prevent the hydrocarbon fluid from penetrating into the surface texture and thereby reduce the adhesion of the thermal hydrocarbon deposits to the surface.

In another embodiment, a method of preventing coke deposits on a surface of a gas turbine component includes, providing the turbine component comprising the surface configured for contacting a hydrocarbon fluid, wherein the substrate comprises a material having a nominal liquid wettability sufficient to generate, with reference to an oil, a nominal contact angle, disposing a plurality of features on the substrate to form an anti-coking surface texture, wherein the plurality of features have a size, shape, and orientation selected such that the surface has an effective wettability sufficient to generate, with reference to an oil, an effective contact angle of greater than the nominal contact angle, and the features comprise a width dimension (a), and a spacing dimension (b), wherein the features prevent the hydrocarbon fluid from penetrating into the surface texture and thereby reduce the adhesion of the coke deposits to the surface.

A combustor for a gas turbine engine can include a combustion chamber configured to contain a hydrocarbon fluid injected into the combustor, and a splashplate disposed at an end of the combustion chamber nearest the hydrocarbon fluid injection and having a surface configured to be in contact with the hydrocarbon fluid, wherein the splashplate comprises a material having a nominal liquid wettability sufficient to generate, with reference to an oil, a nominal contact angle; a plurality of features disposed on the splashplate surface to form an anti-coking surface texture, wherein the plurality of features have a size, shape, and orientation selected such that the surface has an effective wettability sufficient to generate, with reference to an oil, an effective contact angle of greater than the nominal contact angle; and the features comprise a width dimension (a), and a spacing dimension (b), wherein the dimensions prevent the hydrocarbon fluid from penetrating into the surface texture and thereby reduce the adhesion of a coke deposit to the surface, and wherein a ratio of b/a is less than about 2, and ratio of h/a is less than about 5.

The above described and other features are exemplified by the following figures and detailed description.

BRIEF DESCRIPTION OF THE DRAWINGS

Referring now to the figures wherein the like elements are numbered alike.

DETAILED DESCRIPTION OF THE INVENTION

Figure 1:
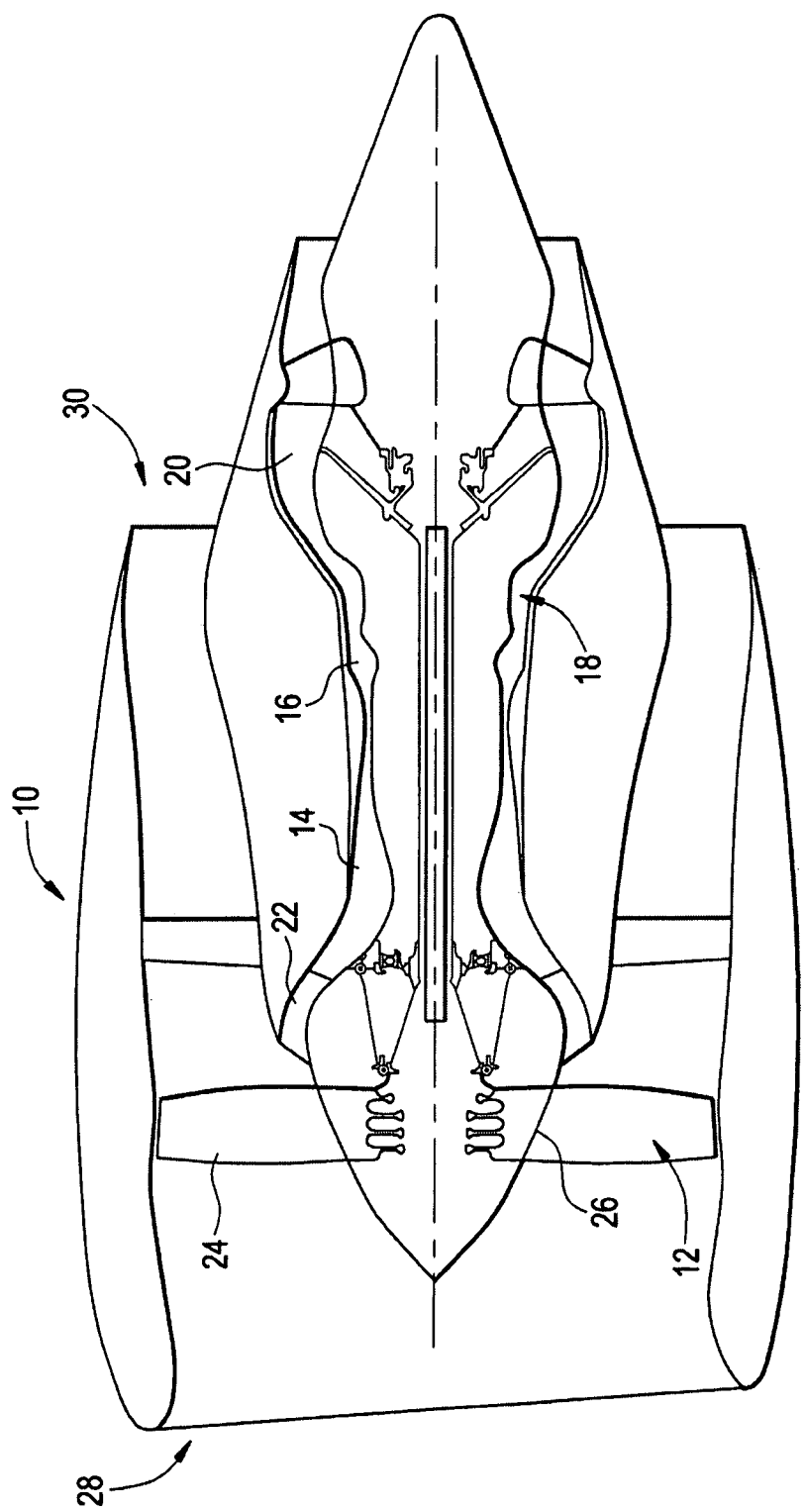
FIG. 1 is a cross-sectional schematic of a gas turbine engine.

The present disclosure relates to surfaces that resist the build-up of thermal deposits, such as for example, coke, soot, carbon particulates, and the like. As described herein, the use of oleophobic surface textures can inhibit the accumulation of such deposits by preventing the oil from significantly wetting the surface. The disclosed texture can promote shedding of oil droplets and prevent the oil from reaching the required coking temperature. The use of appropriate texture also prevents coke nuclei from sticking to the surface, thereby preventing the formation of further coke layers. The surface texture modifications as described herein are configured to inhibit the penetration of oil droplets into the surface texture, thereby reducing the adhesion of the coke deposits to the surface. The term "oleophobic surface" generally is used to mean the physical property of molecule or surface to repel oil. As used herein, the term "oleophobic surface" and "oleophobic surface texture" is more specifically intended to mean any surface that repels a hydrocarbon fuel and inhibits the formation of thermal degradation deposits therefrom. Although the invention is not directed to or limited by any particular hydrocarbon based liquid fuel, typical fuels for which the surfaces can be adapted, and typical fuels from which the substrates of the articles are protected, can include combustible hydrocarbon gases, such as natural gas, and hydrocarbon or distillate fuels, which can include hydrocarbon and distillation products thereof that are generally liquid at room temperature. The fuels can be mixtures of hydrocarbons, mixtures of such distillation products, mixtures of hydrocarbons and distillation products, gasoline, No. 1 or No. 2 diesel fuels, jet engine fuels, such as Jet-A fuel, fuel oils, or any of the foregoing fuels mixed with additives that are well-known in the art. Hydrocarbon based liquid fuels can refer to the liquid fuels which are conventionally used in reaction motors, including but not limited to, industrial gas turbines, engines used in internal or reciprocating combustion engines, including but not limited to automobile and truck engines, jet propelled aircraft, any other gas turbine engine, and the like.

The oleophobic surfaces as disclosed herein can be employed with any component adapted to contact or contain hot hydrocarbon based liquid fuel, for example, liquid hydrocarbon jet engine or diesel fuel, heated at a temperature at which degradation products form in the hydrocarbons. Examples of such articles or components can include, without limitation, conduits for transporting liquid fuel, heat exchangers, boilers, furnaces, fuel storage tanks, fuel injector surfaces, nozzles, combustor linings, and the like. The present disclosure seeks to apply an 'anti-stick' surface condition to the surfaces near the fuel injector where carbon soot can accumulate, so that large-scale deposits are less likely to form, and if formed, would shed at much smaller relative size, causing less erosion in the hot gas path components.

Referring to the drawings in general and to FIG. 1 in particular, it will be understood that the illustrations are for the purpose of describing a particular embodiment of the surface and article disclosed herein and are not intended to be limited thereto. FIG. 1 is a schematic cross-sectional view of an exemplary gas turbine engine. Reference herein will be made to the use of the oleophobic surface treatments in the combustor system of the liquid gas turbine. It is to be understood, however, that the surface treatments disclosed herein, can be advantageously used in any system or process wherein thermal deposits from hydrocarbon fuels, such as coke, soot, carbon, and the like occur on the surface of metals, thereby reducing the performance and operating life of such systems.

With regard to gas turbine engines, anti-coking surfaces can greatly improve the operability of the engines in the combustion system, as well as prevent the restriction of fuel flow to the engine from fuel lines clogged with coke deposits. Moreover, oleophobic textured surfaces in turbine engines can remove the need for fuel additives or active cooling components in the combustion system. As a specific example, a splashplate having an oleophobic textured surface can inhibit coke buildup thereon. By mitigating coke formation on the splashplate, the opportunity for coke deposits to flake off and damage the neighboring barrier coated surfaces is greatly reduced, and as such, the operable life of the turbine is increased.

FIG. 1 illustrates an exemplary embodiment of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30.

In operation, air flows through fan assembly 12 and compressed air is supplied to high pressure compressor 14. The highly compressed air is delivered to combustor 16. Airflow from combustor 16 drives turbines 18 and 20, and turbine 20 drives fan assembly 12.

Figure 2:
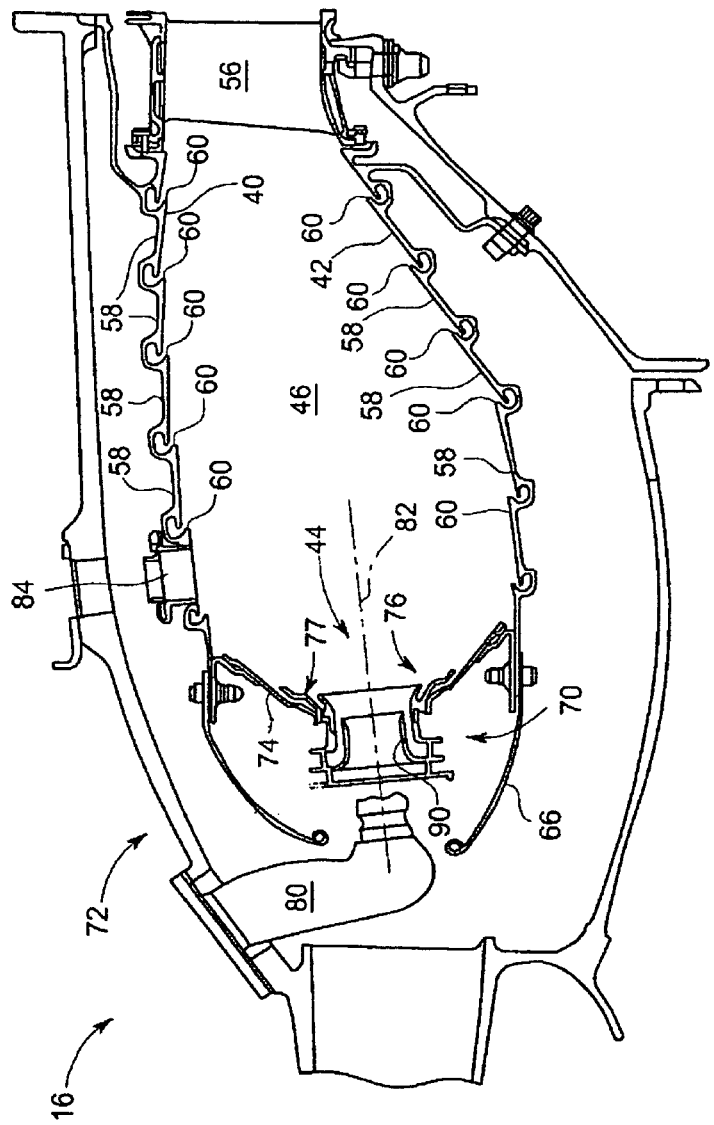
FIG. 2 is a cross-sectional schematic view of a combustor used with the gas turbine engine of FIG. 1.

FIG. 2 is a cross-sectional view of combustor 16 used in gas turbine engine 10. Combustor 16 can include an annular outer liner 40, an annular inner liner 42, and a domed end 44 that extends between outer and inner liners 40 and 42, respectively. Outer liner 40 and inner liner 42 define a combustion chamber 46.

Combustion chamber 46 is generally annular in shape and can be disposed between liners 40 and 42. Outer and inner liners 40 and 42 extend to a turbine nozzle 56 disposed downstream from combustor domed end 44. In the exemplary embodiment, outer and inner liners 40 and 42 each include a plurality of panels 58 which include a series of steps 60, each of which forms a distinct portion of combustor liners 40 and 42. Combustor domed end 44 can include an annular dome assembly 70 arranged in an annular configuration. Combustor dome assembly 70 is configured to provide structural support to an upstream end 72 of combustor 16, and dome assembly 70 includes a dome plate or spectacle plate 74 and a splashplate-flare cone assembly 76. Splashplate-flare cone assembly 76 is unitary and includes a splashplate portion 77.

Combustor 16 can be supplied with fuel via a fuel injector 80 connected to a fuel source (not shown) and extending through combustor domed end 44. More specifically, fuel injector 80 extends through dome assembly 70 and discharges fuel in a direction (not shown) that is substantially concentric with respect to a combustor center longitudinal axis of symmetry 82. Combustor 16 can also include a fuel igniter 84 that extends into combustor 16 downstream from fuel injector 80. Combustor 16 also includes an annular air swirler 90 having an annular exit that extends substantially symmetrically about center longitudinal axis of symmetry 82.

Splashplate portion 77 is configured to prevent hot combustion gases produced within combustor 16 and fuel spray from the injector 80 from splashing back and impinging upon combustor dome plate. As such, the splashplate itself can be susceptible to thermal deposition from the degradation of hydrocarbon fuel on its surface because the function of the splashplate is to direct the flow of the hydrocarbon fuel and carbonaceous gases away from other components. In some cases, as these coke and oil deposits continue to build-up they can flake off during operation and strike other surfaces of the combustor 16. These occurrences can lead to damage within the combustor and reduced operability. By providing a splash plate and/or other components in contact with the heated hydrocarbon fuel with oleophobic surface textures, the formation of thermal degradation deposits on the component surfaces can be mitigated or reduced altogether. In some embodiments, an anti-coking surface having a texture comprised of surface features (as described in more detail below) can be disposed over the entire splashplate surface. However, in certain cases the anti-coking surface texture may only be necessary or desirable at a particular portion or portions of the surface.

Figure 3:
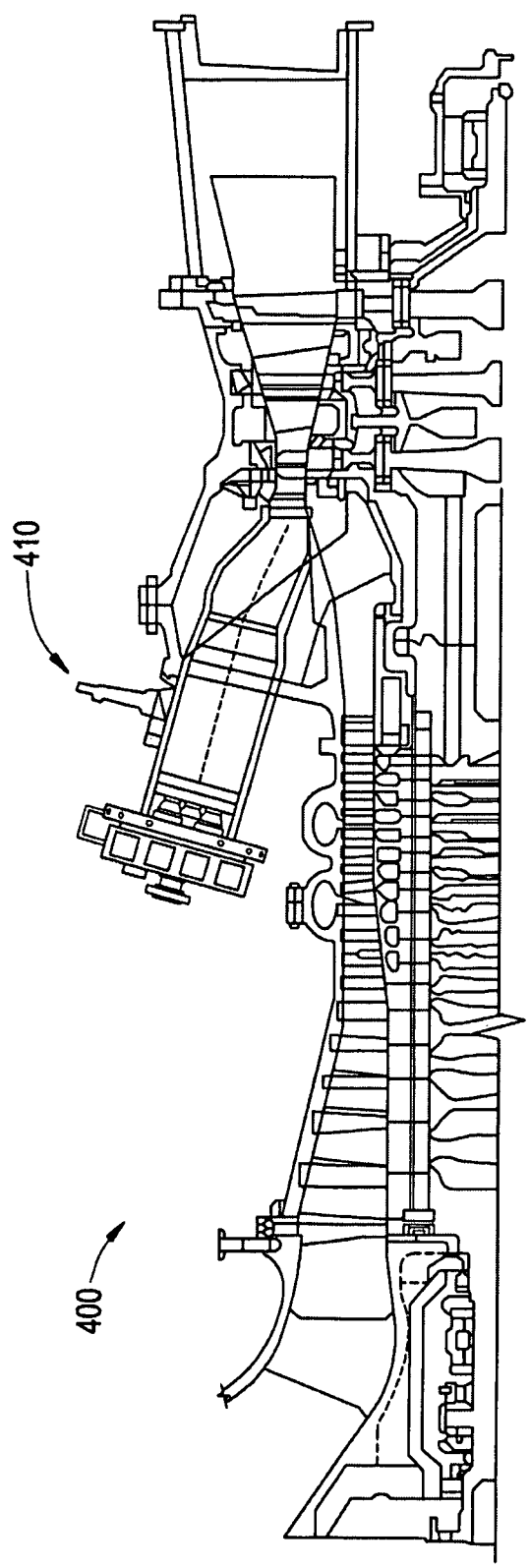
FIG. 3 is a cross-sectional schematic of a ground based heavy-duty or industrial gas turbine engine.
Figure 4:
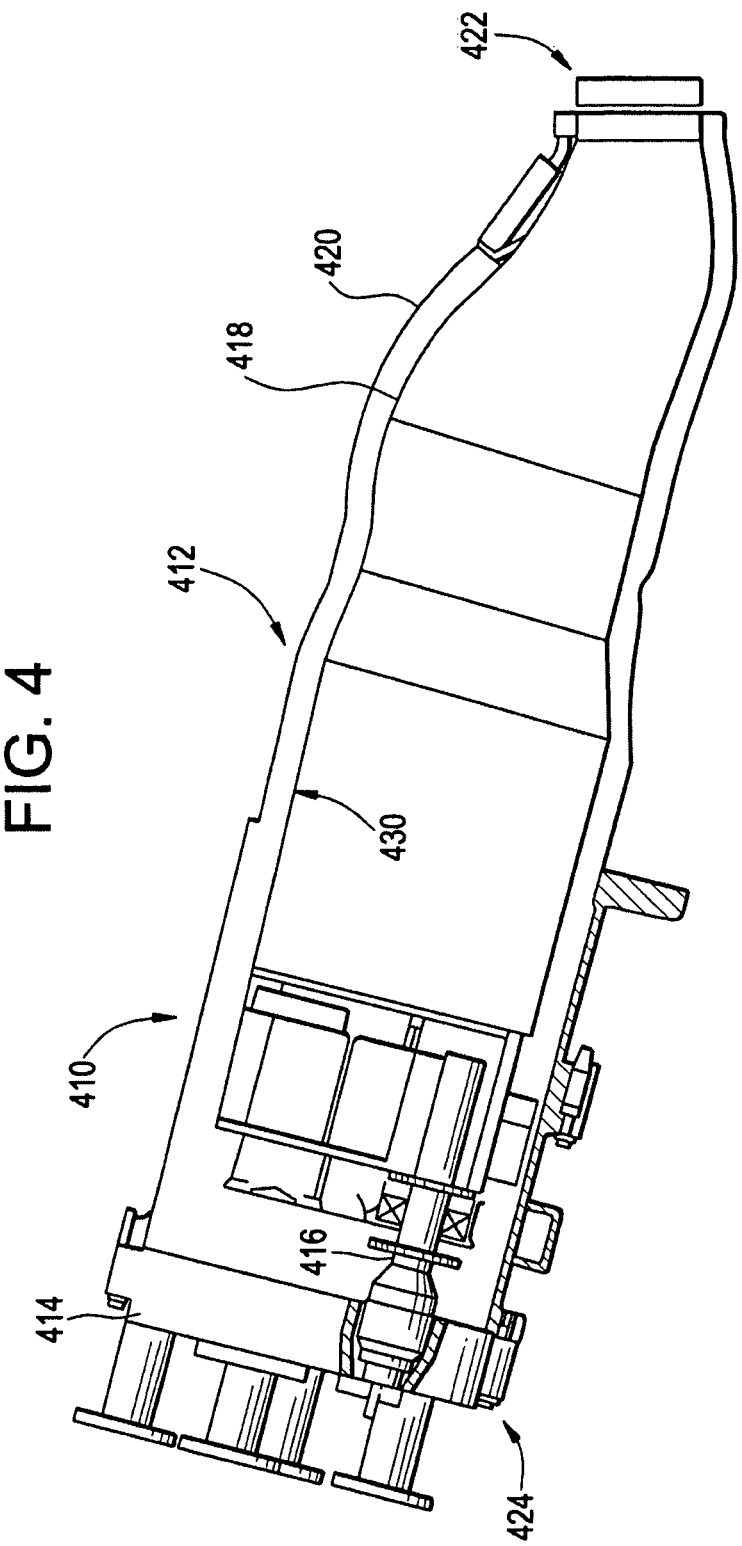
FIG. 4 is cross-sectional schematic view of a combustor used with the gas turbine engine of FIG. 3.

Turning now to another application in which the oleophobic surfaces described herein would be desirable, a ground based industrial gas turbine 400 having a can-annular combustion system 410 is illustrated in FIG. 3. FIG. 4 is an enlarged cross-sectional view of the combustion system 410 illustrated in FIG. 3. Each combustor 410 includes a substantially cylindrical combustor casing 412. The rearward or proximal end of the combustor casing is closed by an end cover assembly 414 which includes supply tubes, manifolds and associated valves for feeding hydrocarbon fuel, air and water to the combustor. The end cover assembly 414 receives a plurality (e.g., three to six) "outer" fuel nozzle assemblies 416 (only one shown in FIG. 4 for purposes of convenience and clarity), arranged in a circular array about a longitudinal axis of the combustor, and one center nozzle.

Within the combustor casing 410, there is mounted, in substantially concentric relation thereto, a substantially cylindrical flow sleeve 418 which connects at its forward end to the outer wall 420 of the double walled transition duct 422. The flow sleeve 418 is connected at its rearward end by means of a radial flange 424 to the combustor casing 412 where fore and aft sections of the combustor casing 412 are joined.

Within the flow sleeve 418, there is a concentrically arranged combustor liner 430 which is connected at its forward end with the inner wall of the transition duct 422. The combustor liner 430 is supported by a combustor liner cap assembly and by a plurality of struts and mounting assemblies (not shown in detail) within the combustor casing 412.

Similar to the splashplate of the combustion system in the aircraft turbine engine, both the surface of the fuel nozzles 416 and the combustor liner 430 are regions of the ground based turbine combustion system that can be prone to coke and carbon deposition. The hydrocarbon liquid fuel and the combusted hydrocarbon gas can be in direct contact, and even coat, the nozzle and combustor liner surfaces. Thermal deposit build-up on the nozzle, aside from flaking off and causing internal surface damage can restrict the flow of hydrocarbon fuel into the combustor itself. This can have the effect of increasing the required pumping pressure and/or restricting fuel flow to the engine. As such, both the fuel nozzle and the combustor liner surfaces, are combustor components that could benefit from oleophobic surfaces for repelling hydrocarbon based liquid fuels.

As used herein, the "contact angle" or "static contact angle" is the angle formed between a stationary drop of a reference liquid and a horizontal surface upon which the droplet is disposed, as measured at the liquid/substrate interface. Contact angle is used as a measure of the wettability of the surface. If the liquid spreads completely on the surface and forms a film, the contact angle is 0 degrees. As the contact angle increases, the wettability decreases. The oleophobic surface treatments as described hereto, will now generally be referred to as an "anti-coking surface" for ease in discussion.

An "anti-coking surface" is meant to describe a surface that has a substantially reduced tendency for oil wetting. An anti-coking surface also promotes shedding of oil droplets more readily than current turbine surfaces. A textured anti-coking surface as described herein prevents the penetration of oil layers into the surface texture resulting in a significant reduction in the adhesion of coke deposits to the surface. The anti-coking surfaces are characterized by reduced thermal deposit build-up compared to surfaces without the disclosed treatment.

The splashplate 77 and interior surfaces of the combustor 16 of FIG. 2 are one example of articles that are ideal for anti-coking surfaces in aircraft and aeroderivative turbine combustion systems. Similarly, the fuel nozzle 416 and combustor liner 430 of FIG. 4 are examples of articles that are ideal for anti-coking surfaces in ground based turbine combustion systems. It is to be understood, however, these anti-coking surfaces can be useful in any combustion system wherein a hydrocarbon based liquid fuel is in contact with a heated surface. Surface treatments in areas where the heated hydrocarbon fluid contact a surface (i.e. coking prone surfaces), such as the splashplate, can provide anti-coking, anti-soot, and the like surface properties.

Figure 5:
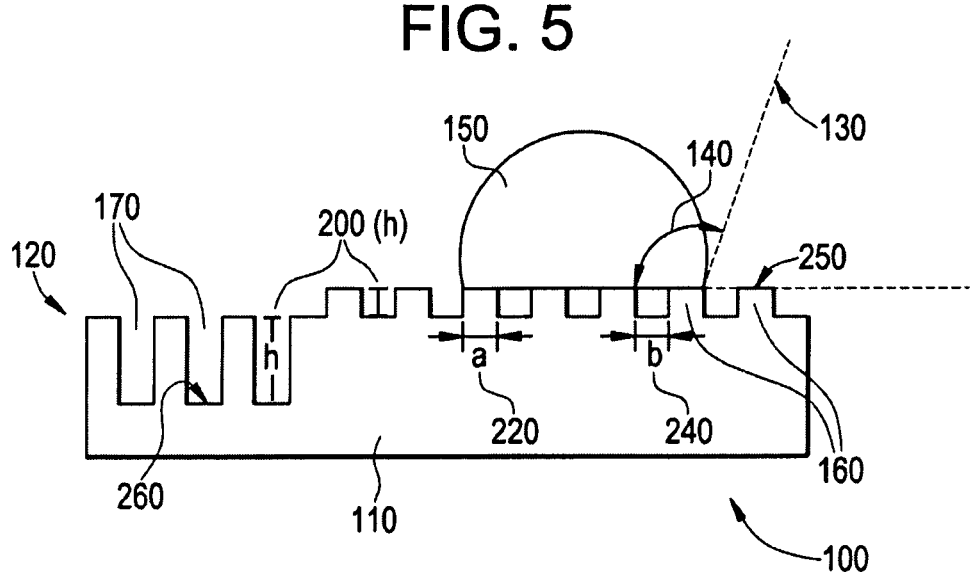
FIG. 5 is a cross-sectional schematic view of an exemplary embodiment of the surface of an article showing the texture.

Referring now to FIG. 5, a schematic cross-sectional view of a coking-prone surface of an article according to an exemplary embodiment of the disclosure herein is illustrated. Article 100 comprises a surface 120. As used herein, the term "surface" refers to that portion of the article 100 that is in direct contact with a hydrocarbon fluid surrounding the article 100. The surface can include the substrate, the features, or the surface modification layer disposed over the substrate, depending on the specific configuration of the article. Surface 120 has a low liquid wettability. One commonly accepted measure of the liquid wettability of a surface 120 is the value of the static contact angle 140 formed between surface 120, and a tangent 130 to a surface of a droplet 150 of a reference liquid at the point of contact between surface 120 and droplet 150. High values of contact angle 140 indicate a low wettability for the reference liquid on surface 120. The reference liquid can be any liquid of interest. As used for the system and processes described above, the reference liquid can be a liquid that contains at least one hydrocarbon. In a particular embodiment, reference liquid is an oil. Examples of oils can include, without limitation, petroleum-based products, such as crude oil and products distilled therefrom, such as kerosene, gasoline, No. 1 or No. 2 diesel fuels, jet engine fuels, such as Jet-A, paraffin, and the like. As used herein, the term "oil resistant" will be understood to refer to a surface that generates a static contact angle with oil of at least about 30 degrees. Because wettability depends in part upon the surface tension of the reference liquid, a given surface may have a different wettability (and hence form a different contact angle) for different liquids.

Figure 6:
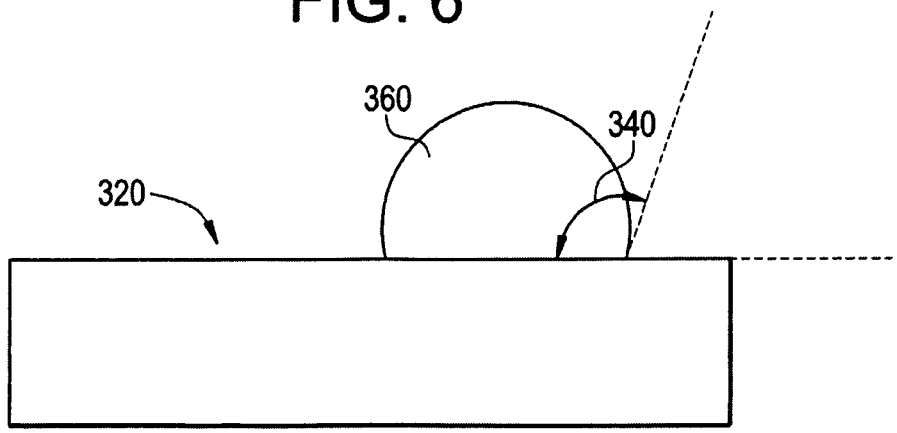
FIG. 6 is a cross-sectional schematic view of a fluid disposed on a nominally flat surface.

The surface 120 comprises a material having a nominal liquid wettability sufficient to generate, with reference to an oil, a nominal contact angle of at least about 30 degrees. For the purposes of understanding the invention, a "nominal contact angle" 340 (FIG. 6) means the static contact angle 340 measured where a drop of a reference liquid 360 is disposed on a flat, smooth (<1 nm surface roughness) surface 320 consisting essentially of the material. This nominal contact angle 340 is a measurement of the "nominal wettability" of the material. In one embodiment, the nominal contact angle, with reference to an oil, is at least about 50 degrees, specifically at least about 70 degrees, more specifically at least about 100 degrees, and even more specifically at least about 120 degrees.

Surface 120 (FIG. 5) comprises at least one material selected from the group consisting of a ceramic and an intermetallic. Suitable ceramic materials include inorganic oxides, carbides, nitrides, borides, and combinations thereof. Non-limiting examples of such ceramic materials include aluminum nitride, boron nitride, chromium nitride, silicon carbide, tin oxide, titania, titanium carbonitride, titanium nitride, titanium oxynitride, stibinite ($SbS_2$), zirconia, hafnia, and combinations thereof. In certain embodiments, the surface comprises an intermetallic. Examples of suitable intermetallic materials include, but are not limited to, nickel aluminide, titanium aluminide, and combinations thereof. The material is selected based on the desired contact angle, the fabrication technique used, and the end-use application of the article.

Surface 120 further comprises a texture comprising a plurality of features 160. By providing a surface 120, comprising a material of comparatively high nominal wettability, with a specific texture, as described in detail below, the resulting textured surface can have significantly lower wettability than that inherent to the material from which the surface is made. In particular, surface 120 has an effective wettability (that is, wettability of the textured surface) for the reference liquid sufficient to generate an effective contact angle greater than the nominal contact angle. In one embodiment, the effective contact angle is greater than the nominal contact angle by at least about 5 degrees, specifically greater than the nominal contact angle by at least about 10 degrees, more specifically greater than the nominal contact angle by at least about 20 degrees, and even more specifically greater than the nominal contact angle by at least about 30 degrees. The effective contact angle depends, in part, on the feature shape, dimensions, and spacings, as will be described in detail below.

As described above, surface 120 has a texture comprising a plurality of features 160. The plurality of features 160 may be of any shape, include at least one of depressions, protrusions, nanoporous solids, indentations, or the like. The features may include bumps, cones, rods, posts, wires, channels, substantially spherical features, substantially cylindrical features, pyramidal features, prismatic structures, combinations thereof, and the like. Numerous varieties of feature shapes are suitable for use as features 160. In some embodiments, as, shown in FIG. 5, at least a subset of the plurality of features 160 protrudes above the surface 120 of the article. In some embodiments, at least a subset of the plurality of features 160 is a plurality of cavities (e.g. pores) 170 disposed in the surface 120. In some embodiments, at least a subset of the features 160 has a shape selected from the group consisting of a cube, a rectangular prism, a cone, a cylinder, a pyramid, a trapezoidal prism, and a hemisphere or other spherical portion. These shapes are suitable whether the feature is a protrusion 160 or a cavity 170.

The size of features 160 (FIG. 5) can be characterized in a number of ways. Features 160 comprise a height dimension (h) 200, which represents the height of protruding features above the surface 120 or, in the case of cavities 170, the depth to which the cavities extend into the surface 120. Features 160 further comprise a width dimension (a) 220. The precise nature of the width dimension will depend on the shape of the feature, but is defined to be the width of the feature at the point where the feature would naturally contact a drop of liquid placed on the surface of the article. The height and width parameters of features 160 have a significant effect on wetting behavior observed on surface 120.

Feature orientation is a further design consideration in the engineering of surface wettability. One significant aspect of feature orientation is the spacing of features. Referring to FIG. 3, in some embodiments features 160 are disposed in a spaced-apart relationship characterized by a spacing dimension (b) 240. Spacing dimension 240 is defined as the distance between the edges of two nearest-neighbor features. Other aspects of orientation may also be considered, such as, for instance, the extent to which top 250 (or bottom 260 for a cavity) deviates from being parallel with surface 120, or the extent to which features 160 deviate from a perpendicular orientation with respect to the surface 120.

In some embodiments, all of the features 160 in the plurality have substantially the same respective values for h, a, and/or b ("an ordered array"), though this is not a general requirement. For example, the plurality of features 160 may be a collection of features, exhibiting a random distribution of size, shape, and/or orientation. In certain embodiments, moreover, the plurality of features is characterized by a multi-modal distribution (e.g., a bimodal or trimodal distribution) in h, a, b, or any combination thereof. Such distributions may advantageously provide reduced wettability in environments where a range of drop sizes is encountered. Estimation of the effects of h, a, and b on wettability are thus best performed by taking into account the distributive nature of these parameters. The features can be varied in any parameter and should be suitable for creating a surface that prevents droplets from penetrating the surface features, and thereby leading to reduced contact between the coke deposit and the textured surface. Accordingly, it will be understood that where the parameters a, b, h, and the like are described herein in the context of the plurality of features, rather than individual features, those parameters are to be construed as representing median values for the plurality of features taken as a population.

Many of the applications for low wettability surfaces, such as anti-coking surfaces, for example, require a reasonably high contact angle for oil, apart from a low level of friction and other contact forces between drop and surface to promote coke deposition build-up. The shape, dimensions, and the spacing of the features, along with the material composition of the surface, all influence the wettability of the surface. As such, it is possible to select the feature dimensions and spacings such that the effective contact angle for oil is optimal to mitigate the formation of thermal deposits (e.g. coking) of the surface. The surfaces thus designed and fabricated have a selected wettability for oil to achieve anti-coking characteristics.

The wetting resistance of a textured surface arises because of the positive capillary pressure the texture generates. This pressure helps keep the droplet from penetrating the texture (e.g., the features) of the surface. For a surface texture comprising a array of square post features having dimensions width 'a', spacing 'b', and height 'h', the capillary pressure can be derived as:

$$P_C = \left(\frac{-4\cos\theta_0}{(1+b/a)^2 - 1}\right)\frac{\gamma_{LV}}{a} \qquad \text{Equation 1}$$

where:

$P_C$ = capillary pressure, $\gamma_{LV}$ = surface tension of the liquid.

For a surface texture comprising an array of cavity features having dimensions radius 'a', spacing between pores of 'b', and height 'h', capillary pressure is given by:

$$P_C = -\frac{2\gamma_{LV}\cos\theta_o}{a} \qquad \text{Equation 2}$$

When a stationary droplet is placed on the surface comprising the features, the above capillary pressures resist the so-called Laplace Pressure ($P_L = 2\gamma_{LV}/R$, where R is the droplet radius). If the drop is impacting the surface with a velocity V then the capillary pressure associated with the surface has to resist the Bernoulli pressure ($P_B \sim \rho V^2/2$). Hence for stationary drops, surface texture has to be designed such that $P_C > P_L$, and for moving drops, surface texture has to be designed such that $P_C > P_B$.

Figure 7:
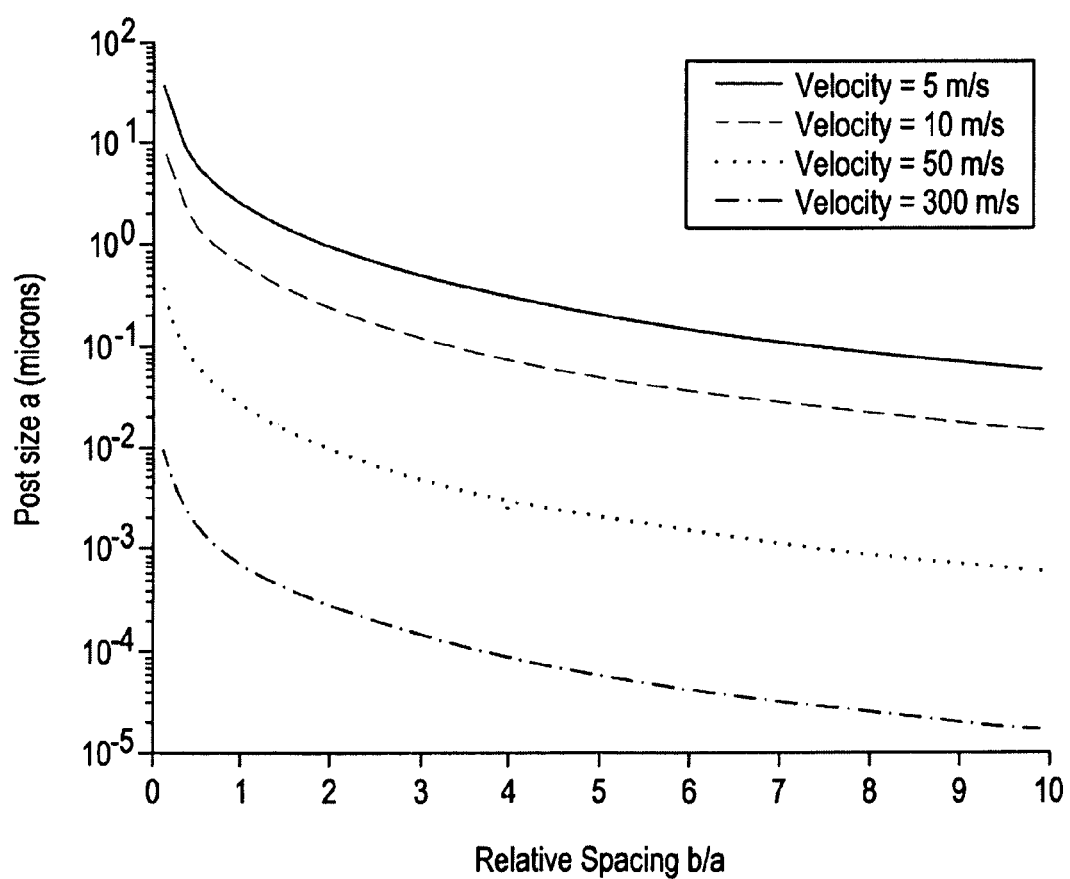
FIG. 7 graphically illustrates the design parameters for post-type features on a surface to remove droplets impinging at different velocities.
Figure 8:
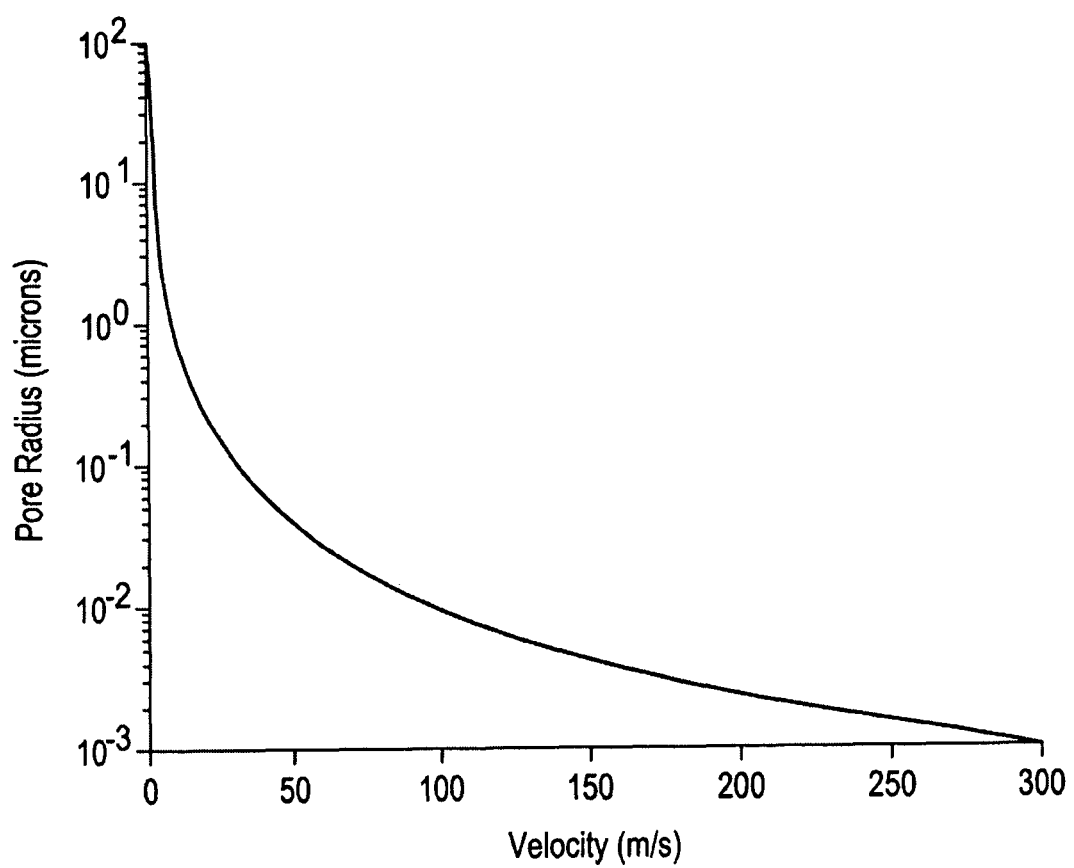
FIG. 8 graphically illustrates the design parameters for pores (e.g., cavities) as the surface feature, rather than posts.

FIG. 7 graphically illustrates the design parameters for post-type features on a surface to remove droplets impinging at different velocities. The figure shows the relationship between post size (i.e., width 'a') and relative spacing of the posts (i.e. spacing-to-width ration b/a) at varying droplet velocities. The regions beneath the curves provide the range of design parameters suitable for removing a liquid droplet at the given velocity. FIG. 8 graphically illustrates the design parameters for pores (e.g., cavities) as the surface feature, rather than posts. The figure shows the relationship between pore radius ('a') and droplet velocity. The region beneath the curve provides the design parameters suitable for removing the liquid droplet at the given velocity.

Figure 9:
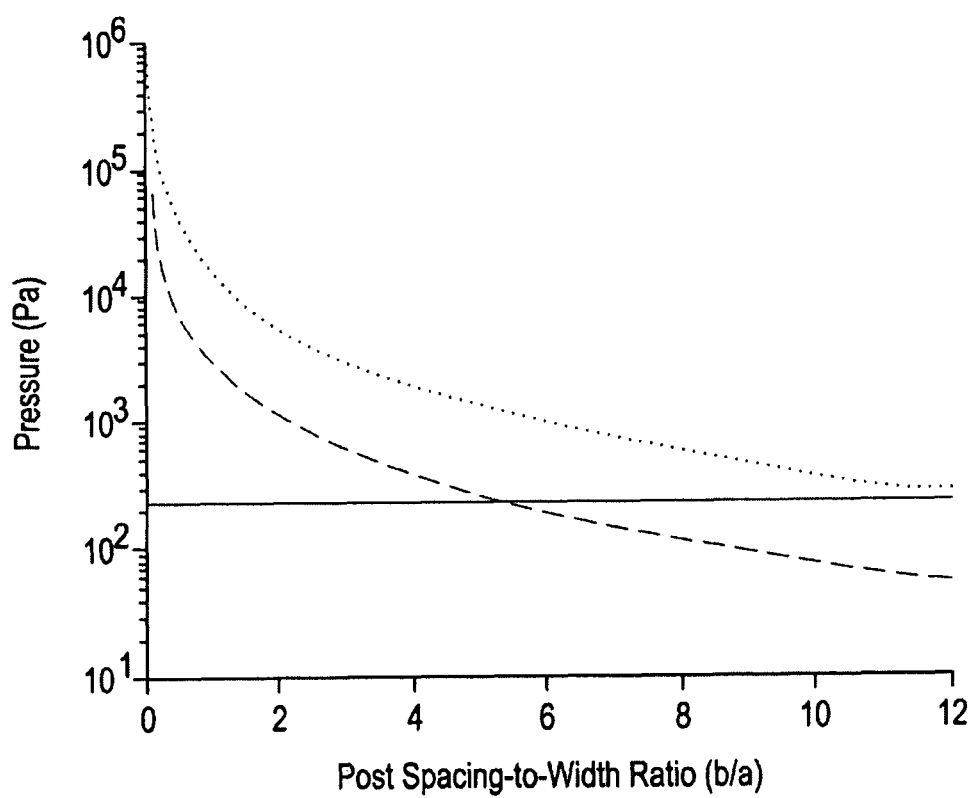
FIG. 9 graphically provides a further comparison between Laplace pressures ($P_L$) and capillary pressures ($P_C$) for the spacing of post features.

FIG. 9 graphically provides a further comparison between Laplace pressures ($P_L$) and capillary pressures ($P_C$). The dependence of capillary and Laplace pressures (measured in Pascals (Pa)) for 1 microliter (μL) of water droplets was calculated as a function of relative post feature surface spacing (i.e., post spacing-to-width ratio b/a). The dashed line represents post features having a width (a) of 15 micrometers. At a relative spacing ratio (b/a) of 6 (i.e., b=90 micrometers), the $P_L$, represented by the solid line, surpasses the $P_C$. The dotted line represents post features having a width (a) of 3 micrometers. As can be seen in FIG. 9, at comparable space-to-width ratios, $P_C$ always exceeds the $P_L$ when using the 3 micrometer-wide posts. These figures, therefore, illustrate that a suitable anti-coking feature size should have a width 'a' less than about 15 micrometers and a relative spacing (b/a) less than about 6 for the surface to be wetting resistant.

To further define suitable parameters for anti-coking surface features, consideration of the effective area fraction of the surface to which the coke deposit might adhere should be calculated. The effective area is provided by the following equations:

Area fraction for posts=$1/(1+b/a)^2$     Equation 3

Area fraction for pores=$1-\pi/4(1+b/a)^2$     Equation 4

Figure 10:
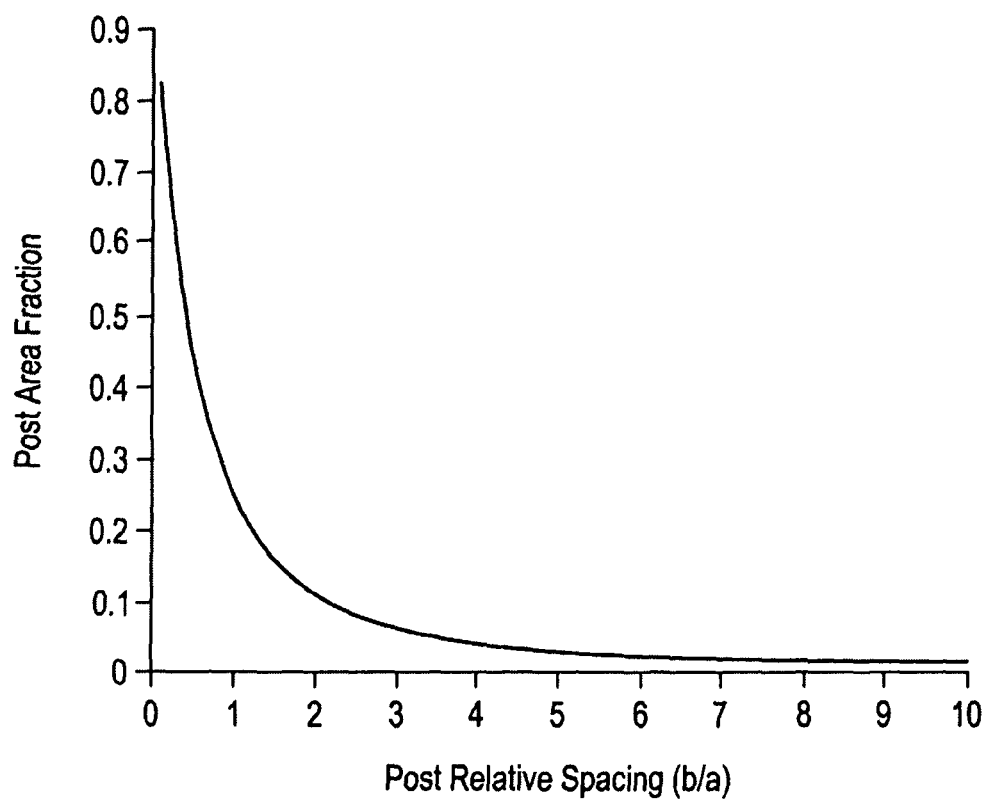
FIGS. 10 and 11 graphically illustrate the area fraction of the surface available for coke deposit adhesion for post features and pore features respectively.
Figure 11:
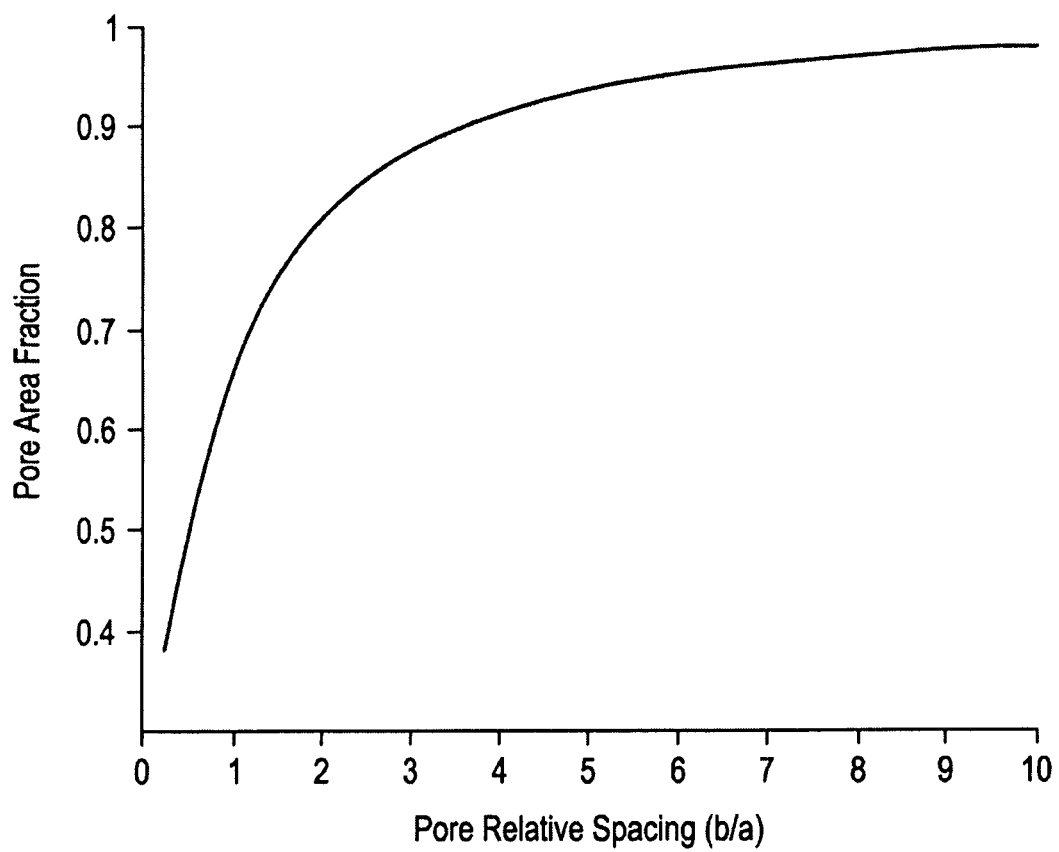

The equations show that, having sparser posts (i.e. greater spacing-to-width ratio) reduces the effective contact area for the coke deposits and, therefore, reduces the chances of adhesion and build-up. FIGS. 10 and 11 graphically illustrate the area fraction of the surface available for coke deposit adhesion for post features and pore features respectively.

Through proper selection of b/a, and h, and a, coupled with proper selection of materials based on the application environment, a surface texture can be designed such that drops of hydrocarbon fluid on the surface will exhibit coke resistant properties combined with easy shedding behavior. Accordingly, the features comprise a height dimension (h), a width dimension (a), and a spacing dimension (b) such that the ratio b/a is less than about 6, and ratio h/a is less than about 10.

For features protruding above the surface, for example posts (FIG. 10), typically parameter a is less than about 15 micrometers. In some embodiments, a is less than about 10 micrometers. In other embodiments, a is less than about 5 micrometers. In still other embodiments, a is less than about 1 micrometer. In some embodiments, a is in the range from about 15 nanometers to about 1 micrometer. In certain embodiments, b/a is in a range from about 0.1 to about 6. In certain other embodiments, b/a is in the range from about 0.5 to about 4. In still other embodiments, b/a is in the range from about 0.5 to about 2. In certain embodiments, h/a is less than about 10. In certain other embodiments, h/a is less than about 5. In still other embodiments, h/a is less than about 1. In a particular embodiment, a is in the range from less than about 25 nanometers to less than about 15 micrometer; h is in the range from less than about 500 nanometers to less than about 150 micrometer; and b is in the range from less than about 100 nanometers to less than about 60 micrometers.

Likewise, as shown in FIG. 11, for features protruding below the surface, for example pores, typically parameter a is less than about 15 micrometers. In some embodiments, a is less than about 10 micrometers. In other embodiments, a is less than about 5 micrometers. In still other embodiments, a is less than about 1 micrometer. In some embodiments, a is in the range from about 15 nanometers to about 1 micrometer. In certain embodiments, b/a is in a range from about 0.1 to about 6. In certain other embodiments, b/a is in the range from about 0.5 to about 4. In still other embodiments, b/a is in the range from about 0.5 to about 2. In certain embodiments, h/a is less than about 10. In certain other embodiments, h/a is less than about 5. In still other embodiments, h/a is less than about 1. In a particular embodiment, a is in the range from less than about 25 nanometers to less than about 15 micrometer; h is in the range from less than about 500 nanometers to less than about 150 micrometer; and b is in the range from less than about 100 nanometers to less than about 60 micrometers.

The plurality of features 160 (FIG. 5) making up texture need not be confined to the surface 120 or a region immediately proximate to the surface 120. In some embodiments, article 100 further comprises a bulk portion 110 disposed beneath surface 120, and the plurality of features 160 extends into bulk portion 110. Distributing features 160 throughout the article 100, including at the surface 120 and within the bulk portion 110, allows surface 120 to be regenerated as the top layer of surface erodes away.

In certain embodiments, the surface comprises a surface energy modification layer (not shown). In certain cases, the surface energy modification layer comprises a coating disposed over a substrate. The substrate may comprise at least one of a metal, an alloy, a ceramic, or any combination thereof. The substrate may take the form of a film, a sheet, or a bulk shape. The substrate may represent article 100 in its final form, such as a finished part; a near-net shape; or a preform that will be later made into article 100. Surface 120 may be an integral part of the substrate. For example, surface 120 may be formed by replicating a texture directly onto the substrate, or by embossing the texture onto the substrate, or by any other such method known in the art of forming or imparting a predetermined surface texture onto a substrate surface. Alternatively, surface 120 may comprise a layer that is disposed or deposited onto the substrate by any number of techniques that are known in the art.

The coating comprises at least one material selected from the group consisting of an oleophobic hard coat, a fluorinated material, a composite material, and various combinations thereof. Examples of suitable olephobic hardcoat includes, but are not limited to, diamond-like carbon (DLC)—including fluorinated DLC, tantalum oxide, titanium carbide, titanium nitride, chromium nitride, boron nitride, chromium carbide, molybdenum carbide, titanium carbonitride, boron nitride, zirconium nitride, electroless nickel, and nickel aluminide. As used herein, "oleophobic hardcoatings" refers to a class of coatings that have hardness in excess of that observed for metals, and exhibit wettability resistance sufficient to generate, with a drop of oil, a nominal static contact angle of at least about 30 degrees. As a non-limiting example, fluorinated DLC coatings have shown significant resistance to wetting by oil. Other hardcoatings such as nitrides, borides, carbides, and oxides, may also serve this purpose. These hardcoatings, and methods for applying them, such as chemical vapor deposition (CVD), physical vapor deposition (PVD), etc., are known in the art, and may be of particular use in harsh environments. Alternatively, the surface modification layer may be formed by diffusing or implanting molecular, atomic, or ionic species into the surface to form a layer of material having altered surface properties compared to material underneath the surface modification layer. In one embodiment, the surface modification layer comprises ion-implanted material, for example, ion-implanted metal.

Articles with controlled wettability for oil are attractive for many applications prone to thermal deposition problems, such as coking. Examples of potential applications of the embodiments disclosed herein include combustion systems in engines, such on-wing and aeroderivate gas turbine engines, commercial boilers, furnaces, and the like. Other exemplary articles include, but are not limited to pipes and tubing for heated hydrocarbon fluid transport to the engine combustion systems. The nature of the application will determine the extent to which features are to be disposed on an article. The coking results in degradation of the surfaces on which the deposits form and can lead to reduced performance of combustion systems. The anti-coking properties of the articles disclosed herein will improve the performance and increase the life of current systems prone to coking and other thermal deposition related problems.

Another aspect of the invention comprises a method to render the surface of an article anti-coking. The method comprises: providing an article comprising a coking-prone substrate; disposing a plurality of features on the substrate to form a surface, such that coking of the surface is reduced. The substrate comprises a material having a nominal liquid wettability sufficient to generate, with reference to an oil, a nominal contact angle. The features have a size, shape, and orientation selected such that the surface has an effective wettability sufficient to generate, with reference to an oil, an effective contact angle of greater than the nominal contact angle. The features comprise a height dimension (h), a width dimension (a), a spacing dimension (b) such that ratio b/a is less than about 2, and ratio h/a is less than about 10. The surface has an effective contact angle, with reference to an oil, greater than about 30 degrees.

The features are disposed on the substrate to form a surface. The features may be disposed onto the substrate by any texturing methods known in the art. Examples of some suitable methods include, lithography, soft lithography, embossing, forming, etching, template growth, film deposition, laser drilling, sand blasting, thermal spray, electrochemical etching, and the like. The features may comprise the same material as the substrate or another material. The exact choice of the substrate and feature materials, and feature size and spacing depends, in part, on the desired wettability of the surface, as discussed above. Typically, the surface has the effective contact angle, with reference to an oil, greater than about 30 degrees. In some embodiments, the surface has the effective contact angle, with reference to an oil, greater than about 50 degrees. In other embodiments, the surface has the effective contact angle, with reference to an oil, greater than about 100 degrees.

The aforementioned embodiments present clear advantages over existing methods for mitigating thermal deposits in gas turbine engine component surfaces. For example, the turbine components comprising the foregoing surfaces offer increased life and operability over current components that suffer from thermal deposition. The anti-coking surfaces disclose herein can advantageously inhibit the formation of thermal deposits, particularly coking, without resorting to modification of the hydrocarbon fluid, without adoption of special procedures, and without the installation of special equipment could be desirable for current liquid fuel turbines and other like apparatuses.

The following example serves to illustrate the features and advantages offered by the embodiments of the present invention, and are not intended to limit the invention thereto.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to a preferred embodiment, it will be understood that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of preventing thermal hydrocarbon degradation deposits on a surface of a gas turbine component, the method comprising:
    providing a turbine component within a combustion chamber where the component is contacted by hydrocarbon fuel or combustion products thereof during operation of the chamber,
    supplying hydrocarbon fluid to the combustion chamber and
    combusting the hydrocarbon fluid within the chamber,
    wherein the surface of the component comprises a material having a nominal liquid wettability sufficient to generate, with reference to an oil, a nominal contact angle;
    wherein a plurality of features have been disposed on the surface of the component to form an anti-deposition textured surface, wherein the plurality of features have a size, shape, and orientation selected such that the surface has an effective wettability sufficient to generate, with reference to an oil, an effective contact angle of greater than the nominal contact angle; and
    wherein the features comprise a width dimension (a), and a spacing dimension (b), and wherein the features prevent the hydrocarbon fluid or combustion product thereof from penetrating into the textured surface and thereby reduce adhesion of thermal hydrocarbon deposits to the textured surface of the turbine component.

2. The method of claim 1, wherein the plurality of features are configured to achieve a capillary pressure is greater than a Laplace pressure for a droplet of the hydrocarbon fluid.

3. The method of claim 1, wherein the plurality of features are configured to achieve a capillary pressure greater than the Bernoulli pressure of a droplet of the hydrocarbon fluid impacting the textured surface.

4. The method of claim 1, wherein at least a subset of the plurality of features protrude above the surface of the gas turbine component.

5. The method of claim 4, wherein at least a subset of the protruding features has a shape selected from the group consisting of a cube, a post, a rectangular prism, a cone, a cylinder, a pyramid, a trapezoidal prism, and a hemisphere or other spherical portion.

6. The method of claim 5, wherein the subset of the protruding features comprise a plurality of posts, and wherein the width dimension (a) is less than about 25 micrometers, a ratio of b/a is between about 0.1 and about 6, and a ratio of a height dimension (h) to the width dimension (a) is less than about 10.

7. The method of claim 5, wherein the subset of the protruding features comprise a plurality of posts, and wherein the width dimension (a) is less than about 5 micrometers, and a ratio of b/a is between about 0.5 and about 4.

8. The method of claim 5, wherein the subset of the protruding features comprise a plurality of posts, and wherein the width dimension (a) is less than about 1 micrometers, and a ratio of b/a is between about 0.5 and about 2.

9. The method of claim 1, wherein at least a subset of the plurality of features is a plurality of cavities disposed on the textured surface.

10. The method of claim 9, wherein the width dimension (a) is less than about 25 micrometers, a ratio of b/a is less than about 6, and a ratio of a height dimension h to the width dimension (a) is less than about 10.

11. The method of claim 9, wherein the width dimension (a) is less than about 5 micrometers, and a ratio of b/a is less than about 4.

12. The method of claim 9, wherein the width dimension (a) is less than about 1 micrometer, and a ratio of b/a is less than about 2.

13. The method of claim 1, wherein the features comprise at least one, material selected from the group consisting of a ceramic, an intermetallic compound, and a polymer; wherein the ceramic comprises a material selected from the group consisting of titanium nitride, titanium carbonitride, chromium nitride, boron nitride, silicon carbide, electroless nickel, and aluminum nitride and combinations thereof; wherein the intermetallic compound comprises nickel aluminide, and titanium aluminide, and combinations thereof;

and wherein the polymer comprises polytetrafluoroethylene, fluoroacrylate, fluoroeurathane, fluorosilicone, fluorosilane, modified carbonate, silicones and combinations thereof.

14. The method of claim 1, wherein the hydrocarbon fluid is selected from the group consisting of crude oil, products distilled from crude oil, industrial lubricants, bearing oil, and light turbine oil.

15. A method of preventing coke deposits on a surface of a gas turbine component, the method comprising:
providing a turbine component within a combustion chamber where the component is contacted by hydrocarbon fuel or combustion products thereof during operation of the chamber, wherein the surface of the component comprises a material having a nominal liquid wettability sufficient to generate, with reference to an oil, a nominal contact angle;
supplying hydrocarbon fluid to the combustion chamber and
combusting the hydrocarbon fluid within the chamber,
wherein a plurality of features have been disposed on the surface of the turbine component to form an anti-coking textured surface, wherein the plurality of features have a size, shape, and orientation selected such that the surface has an effective wettability sufficient to generate, with reference to an oil, an effective contact angle of greater than the nominal contact angle; and
wherein the features comprise a width dimension (a), and a spacing dimension (b), and wherein the features prevent the hydrocarbon fluid or combustion product thereof from penetrating into the textured surface and thereby reduce adhesion of coke deposits to the textured surface of the turbine component.

16. The method of claim 15, wherein at least a subset of the plurality of features protrude above the textured surface of the gas turbine component.

17. The method of claim 16, wherein the subset of the protruding features comprise a plurality of posts, wherein a ratio of b/a is in a range of about 0.5 to about 2, and a ratio of a height dimension h to the width dimension (a) is less than about 1.

18. The method of claim 15, wherein at least a subset of the plurality of features is a plurality of cavities disposed on the textured surface.

19. The method of claim 18, wherein the dimensions of the plurality of cavities comprise a ratio of b/a in a range of about 0.5 to about 2, and a ratio of a height dimension h to the width dimension (a) is less than about 1.

20. A combustor for a gas turbine engine, comprising:
a combustion chamber configured to contain a hydrocarbon fluid injected into the combustor; and
a splashplate disposed at an end of the combustion chamber, the splashplate having a surface that is contacted with the hydrocarbon fluid or combustion product thereof, wherein the splashplate comprises a material having a nominal liquid wettability sufficient to generate, with reference to an oil, a nominal contact angle;
a plurality of features disposed on the splashplate surface to form a textured anti-coking surface, wherein the plurality of features have a size, shape, and orientation selected such that the textured anti-coking surface has an effective wettability sufficient to generate, with reference to an oil, an effective contact angle of greater than the nominal contact angle; and wherein
the features comprise a width dimension (a), and a spacing dimension (b), and wherein the features prevent hydrocarbon fluid or combustion product thereof from penetrating into the textured anti-coking surface and thereby reduce adhesion of a coke deposit to the textured anti-coking surface,
wherein a ratio of b/a is less than about 2, and a ratio of h/a is less than about 5.

* * * * *

UNITED STATES PATENT AND TRADEMARK OFFICE
CERTIFICATE OF CORRECTION

| | |
|---|---|
| PATENT NO. | : 9,062,563 B2 |
| APPLICATION NO. | : 12/100029 |
| DATED | : June 23, 2015 |
| INVENTOR(S) | : Varanasi et al. |

It is certified that error appears in the above-identified patent and that said Letters Patent is hereby corrected as shown below:

Specification

In Column 6, Line 30, delete "casing 410," and insert -- casing 412, --, therefor.

In Column 8, Line 8, delete "stibinite" and insert -- stibnite --, therefor.

In Column 8, Line 42, delete "as," and insert -- as --, therefor.

In Column 11, Line 64, delete "olephobic" and insert -- oleophobic --, therefor.

Claims

In Column 14, Line 19, in Claim 2, delete "is greater" and insert -- greater --, therefor.

In Column 14, Line 60, in Claim 13, delete "one, material" and insert -- one material --, therefor.

In Column 15, Line 2, in Claim 13, delete "fluoroeurathane," and insert -- fluorourethane, --, therefor.

In Column 16, Line 11, in Claim 19, delete "is less" and insert -- less --, therefor.

In Column 16, Line 26, in Claim 20, delete "of greater" and insert -- greater --, therefor.

Signed and Sealed this
Third Day of November, 2015

Michelle K. Lee
*Director of the United States Patent and Trademark Office*